United States Patent Office 3,429,774
Patented Feb. 25, 1969

3,429,774
PREVENTION OF SEIZING IN LIQUID METAL ENVIRONMENTS
David H. Gurinsky, Center Moriches, Richard M. Powers, Stormville, and Herbert Susskind, Huntington, N.Y., assignors to the United States of America as represented by the United States Atomic Energy Commission
No Drawing. Filed Nov. 28, 1967, Ser. No. 686,299
U.S. Cl. 176—38                                    5 Claims
Int. Cl. G21c 9/00; C23c 11/00

ABSTRACT OF THE DISCLOSURE

A method of operating a sodium cooled nuclear reactor containing a stacked bed of spherical fuel elements in which the fuel is dispersed in a matrix of stainless steel. In order to prevent sintering of the fuel elements, the steel is provided with a deoxidant selected from the group consisting of titanium, niobium and aluminum.

Background of the invention

Advances in nuclear reactor technology have reached the point where breeder reactors are approaching feasibility. In such reactors there is substantial interest in the use of liquid metal coolants which have the advantage of high heat carrying capacity and conductivity. Because of the necessity of operating in such an environment, there is increasing interest in liquid metal technology generally.

An example of a nuclear reactor utilizing liquid metal as a coolant is that shown in U.S. Patent No. 3,140,235 issued in the name of Hatch et al. Another reactor is one which would incorporate the fuel assemblies shown in U.S. Patent 3,262,859 issued to W. E. Winsche. In both reactors, the liquid metal flows through a stationary assembly of packed spheres of fuel bearing material. Also of interest are contact points of valve seats, bearing surfaces, and similar elements operating in such a liquid metal environment. An important difficulty which arises in the aforementioned arrangements is the tendency of the contacting surfaces to sinter together or seize. Hence, there is a great deal of interest to provide metals suitable for use as a matrix for dispersed fissionable material and which will successfully resist sintering together under the mentioned conditions over long periods of time. As an example of this type of problem, a series of tests were run in which balls of chromium-nickel stainless steel were stacked in an environment of flowing sodium at 700° C. with an external load of 11.6 pounds on each ball support point. Examinations of the balls after the runs were completed showed extensive sintering at the points of contact had taken place.

Summary of the invention

The invention described herein was made in the course of, or under a contract with the United States Atomic Energy Commission.

This invention relates to a method of operating a sodium cooled reactor and preventing sintering together of fueled spherical contacting elements in a liquid sodium environment by the use of a deoxidant to form self-generating and self-healing oxide coatings.

It is therefore a principal object of this invention to provide a method of preventing sintering together of elements in a liquid alkali metal environment.

Other objects and advantages of this invention will hereinafter become readily apparent from the following description of preferred embodiments of this inventon.

Description of the preferred embodiments

In the environment of a liquid metal, such as that of sodium, metallic surfaces in contact with each other have a tendency to agglomerate or stick together as a result of the mutual diffusion of the metals under the very high temperature conditions. In order to prevent this from occurring, especially in a nuclear reactor utilizing sodium cooling, it has been discovered that certain iron-based alloys of the stainless steel variety useful as fuel matrixes and other contacting elements resist this tendency to sinter providing a deoxidant is present which will react with the oxygen present in the sodium and form relatively impermeable oxide coatings on the contacting surfaces to prevent seizing. These coatings are self-generating, that is, they are formed in situ, and in the event of being breached, are self-healing.

In accordance with this invention, spherical iron-based alloy particles stacked in intimate contact with each other and subject to compression in a flowing sodium environment, containing at least 0.1% by weight of either titanium, niobium or aluminum, will prevent sintering together of contacting surfaces, provided the sodium contains about 10 p.p.m. of oxygen to provide the reaction with the deoxidant and form the oxide coatings which prevent the sintering.

In order to demonstrate the principles of this invention, a stainless steel block about 1 5/16 inches in diameter and 3 inches in length was used. Several circular holes were drilled through the length of the block to accommodate ¼ inch diameter spheres with extra channels along the lengths of the holes to insure good sodium flow. A vertical column of spheres was put in each of the holes and the top of each column was closed off with a cover and a weight. In this way selected loadings were put on the spheres. Liquid sodium containing the designated oxygen content at temperatures ranging from 450 to 700° C. was circulated upwardly through the block for periods of time up to a week at a flow velocity in the block of approximately 0.1 ft./sec. Static loadings of the spheres ranged at the contact points at 11.6 to 22.7 lbs. A sampling of the iron-based alloys, which in the examples shown, were stanless steels, tested to demonstrate this invention are shown for illustrative purposes in the table below.

Upon removal of the spheres after completion of the test runs it was found that the spheres which contained one of the deoxidants titanium, niobium, or aluminum

TABLE.—COMPOSITION, W/O

| Iron-based alloys | Alloying ingrdients | | | Deoxidants | | |
|---|---|---|---|---|---|---|
| | Cr | Ni | C | Ti | Nb | Al |
| (1) | 18.00–20.00 | 8.00–11.00 | 0.08 max. | | | |
| (1) | 18.00–20.00 | 8.00–11.00 | 0.08 max. | 1.20 | | |
| (1) | 17.00–19.00 | 8.00–11.00 | 0.08 max. | ³5×C | | |
| (2) | 17.00–19.00 | 9.00–12.00 | 0.08 max. | | ³10×C | |
| (2) | 11.50–13.50 | 0.50 max. | 0.15 max. | | | |
| (2) | 11.50–13.50 | 0.50 max. | 0.08 max. | | | 0.10–0.30 |

¹ Mn, 2.00 max.; Si 1.00 max.
² Mn, 1.00 max.; Si, 1.00 max.
³ Minimum.

did not sinter together. However, the spheres shown in the table not containing any of these materials were sintered together or to the walls of the chamber.

From the various tests conducted it was found that at least 0.1% w/o the deoxidant had to be present in order to produce effective self-generated and self-healing oxide coatings.

Instead of utilizing elements containing the deoxidant in the matrix, each of the spherical elements may instead have a cladding of the materials already described with the deoxidant. In such a case the cladding should have a thickness of at least 30 microns.

It is thus seen that there has been provided a method of operating a sodium cooled nuclear reactor which is capable of avoiding the sintering together of the fueled spherical elements.

While only preferred embodiments of this invention have been described, it is understood that many variations thereof are possible without departing from the principles of this invention. For example, it is evident that the principles of this invention are fully applicable to those situations in a liquid sodium environment wherever surfaces are in contact with each other, such as pump elements, valve seats and bearing surfaces. Thus the invention is to be defined only by the scope of the appended claims.

What is claimed is:

1. The operation of a nuclear reactor comprising the steps of:
    (a) loading said reactor with a bed of fuel elements in intimate contact with each other and subject to compression, each of said elements consisting of an iron-based alloy matrix containing dispersed fissile material and deoxidant, the latter in the amount of at least about 0.1% by weight, said deoxidant selected from the group consisting of titanium, niobium, and aluminum; and
    (b) circulating liquid sodium coolant through said bed of fuel elements, said sodium containing about 10 p.p.m. of oxygen to react with said deoxidant and form a protective self-healing oxide coating on each of said elements to prevent sintering at the points of contact between adjacent elements.

2. The method of claim 1 in which said sodium is at a temperature within the range of 450 to 700° C.

3. The method of claim 1 in which said deoxidant is dispersed within a coated region of said elements.

4. The method of claim 3 in which said region is of at least a 30 micron thickness.

5. The method of preventing seizing of surfaces in contact with each other under compression in a liquid metal environment comprising the step of immersing in liquid sodium containing about 10 p.p.m. of oxygen contacting surfaces consisting of an iron-based alloy containing a deoxidant in the amount of at least about 0.1% by weight, said deoxidant selected from the group consisting of titanium, niobium, and aluminum.

References Cited

UNITED STATES PATENTS

| | | | |
|---|---|---|---|
| 2,516,986 | 8/1950 | Heinse | 148—6.11 |
| 2,864,731 | 12/1958 | Gurinsky et al. | 176—38 |
| 3,139,681 | 7/1964 | Goslee et al. | 176—89 |
| 3,140,235 | 7/1964 | Hatch et al. | 176—40 |
| 3,244,597 | 4/1966 | Tower | 176—45 |

CARL D. QUARFORTH, *Primary Examiner.*

H. E. BEHREND, *Assistant Examiner.*

U.S. Cl. X.R.

117—114; 148—6.11; 176—40, 91, 92